United States Patent

Staquet et al.

[11] Patent Number: 5,968,298
[45] Date of Patent: Oct. 19, 1999

[54] AUTOMOBILE ROOF REPAIR METHOD

[75] Inventors: Edward T. Staquet, Broomall, Pa.; William J. Anderton, Wonder Lake, Ill.

[73] Assignee: Lord Corporation, Cary, N.C.

[21] Appl. No.: 08/834,669

[22] Filed: Apr. 1, 1997

[51] Int. Cl.⁶ .............................. B32B 31/18; B32B 35/00
[52] U.S. Cl. ..................... 156/98; 156/256; 29/402.08; 29/402.11
[58] Field of Search .............................. 156/94, 98, 256, 156/71; 29/402.01, 402.08, 402.11, 402.09; 296/210

[56] References Cited

U.S. PATENT DOCUMENTS

| | | |
|---|---|---|
| 4,070,225 | 1/1978 | Batdorf . |
| 4,473,419 | 9/1984 | Hardy ................................ 29/402.09 X |
| 4,560,428 | 12/1985 | Sherrick et al. . |
| 4,857,131 | 8/1989 | Damico et al. . |
| 4,887,862 | 12/1989 | Bassi . |
| 5,729,463 | 3/1998 | Koenig et al. . |

*Primary Examiner*—Sam Chaun Yao
*Attorney, Agent, or Firm*—Wayne W. Rupert

[57] ABSTRACT

A method for repairing a damaged automobile exterior roof panel the includes removing the damaged roof panel section so as to leave an overlap portion of the original roof panel extending peripherally around the edge of the opening, fashioning a replacement roof panel that includes a peripheral bonding section that extends beyond the outermost dimension of the opening, and then adhesively bonding the overlap portion of the original roof panel to the peripheral bonding section of the replacement roof panel.

3 Claims, 4 Drawing Sheets

AUTOMOBILE ROOF REPAIR METHOD

BACKGROUND OF THE INVENTION

Automobile roof panels often become damaged due to crashes, airborne objects such as falling tree branches or hail or other causes. Such damaged roof panels previously were repaired by one of two methods. According to one method the entire roof panel, the windshield, rear glass and the headliner are all removed. The windshield and rear glass must be removed because they are permanently bonded to the roof panel. Depending upon the vehicle construction the side glass also might require removal. Removal and replacement of the entire roof panel is expensive in terms of both parts cost and labor cost. In addition, there is a substantial risk of breaking the windshield, rear glass or side glass. According to a second method the damaged roof panel is cut out. A new roof panel section then is fit into the area of the removed section and attached to the remaining roof panel via welding. The problem with this method is that welding causes heat distortions in the roof material, creates potentially dangerous sparks, requires the services of a skilled technician and may result in seams in the roof panel if done improperly.

The resulting safety and cost of repairing an automobile roof panel could be substantially improved by the development of a repair method that does require removal of the entire roof panel or any welding.

SUMMARY OF THE INVENTION

The present invention is a method for repairing an automobile roof panel that does not require welding or the removal of the entire roof panel, glass, headliner and vehicle upholstery. The method includes removing a section of the roof panel that contains the damage resulting in the formation of an opening such that a peripheral overlap portion of the roof panel remains, wherein the peripheral overlap portion has an exterior surface and extends from the edge of the opening to (a) a joint between the roof panel and a windshield, (b) a joint between the roof panel and a rear glass, or (c) a joint between the roof and a door side support frame; providing a replacement roof panel that includes a peripheral bonding section having an interior surface and that extends beyond the outermost dimensions of the opening; applying adhesive at least one of the exterior surface of the peripheral overlap portion and the interior surface of the peripheral bonding section; and then bonding the exterior surface of the peripheral overlap portion with the interior surface of the peripheral bonding section so as to permanently attach the replacement roof panel.

BRIEF DESCRIPTION OF THE DRAWINGS

Preferred embodiments of the present invention shall be described in more detail in conjunction with the following representative drawings.

DETAILED DESCRIPTION OF THE PREFERRED EMBODIMENTS

As used herein, "exterior" means facing away from the interior of an automobile or positionally located farther away from the interior of an automobile. "Interior" means facing towards the interior of an automobile or positionally located more closely to the interior of an automobile.

Figure 1:
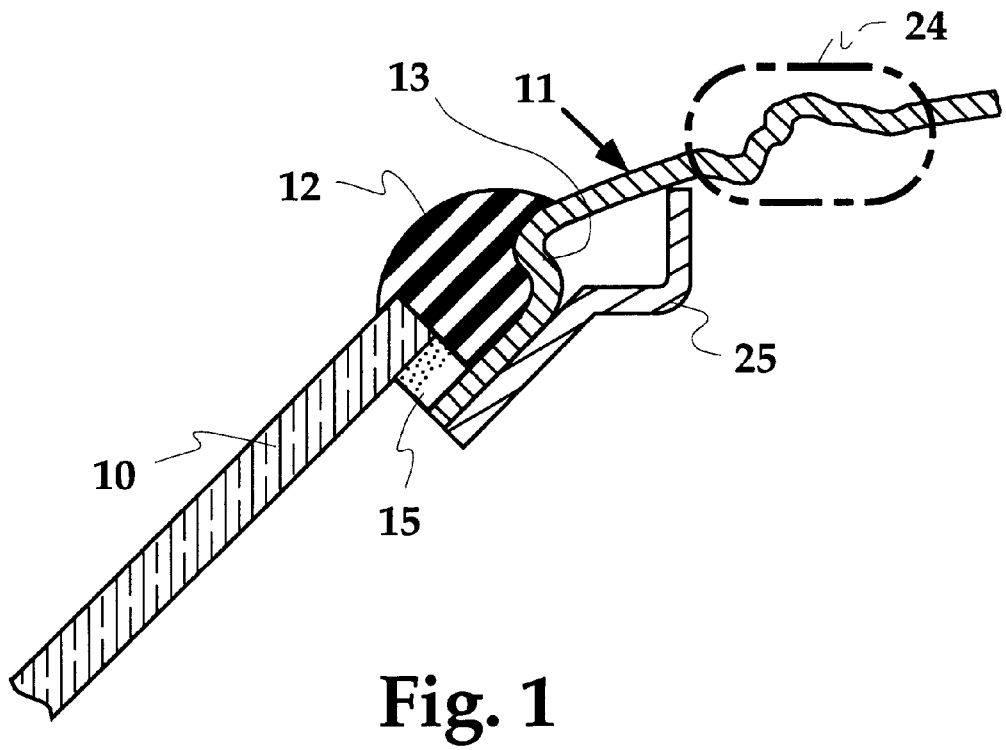
FIG. 1 is a cross-sectional side view of a damaged automobile roof panel joined to a windshield or a rear glass.

FIG. 1 depicts an assembly that includes a damaged automobile exterior roof panel 11 joined to a windshield 10 or rear glass 10'. The roof panel 11 is joined to a front or back frame support beam 25 (typically via spot welding). The damaged roof panel 11 can have an extensive area of damage 24 or only a relatively small damage area 24. The damaged roof panel 11 can be joined to the windshield 10 or rear glass 10' by any means known in the art, but FIG. 1 shows a common joint structure. The damaged roof panel 11 includes an original roof flange 13 that is joined via glass-to-metal adhesive 15 to the windshield 10 or rear glass 10'. The roof panel 11 can be made from metal or sheet molding compound (SMC), preferably metal. Molding and/or trim 12 (which fits into a molding channel 26 shown in FIG. 7) serves as a protective cap for the joint area.

Figure 3:
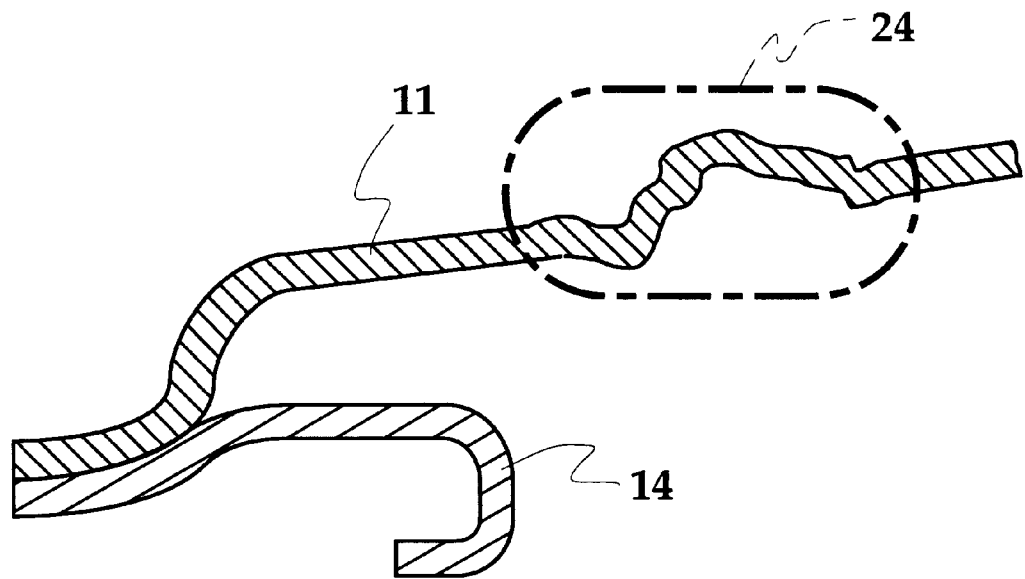
FIG. 3 is a cross-sectional side view of a damaged automobile roof panel joined to a support structure located on a door side of the automobile.

FIG. 3 depicts an assembly that includes the damaged roof panel 11 joined to a door side frame support 14 of an automobile. There can be trim and/or molding at this door side joint.

Figure 7:
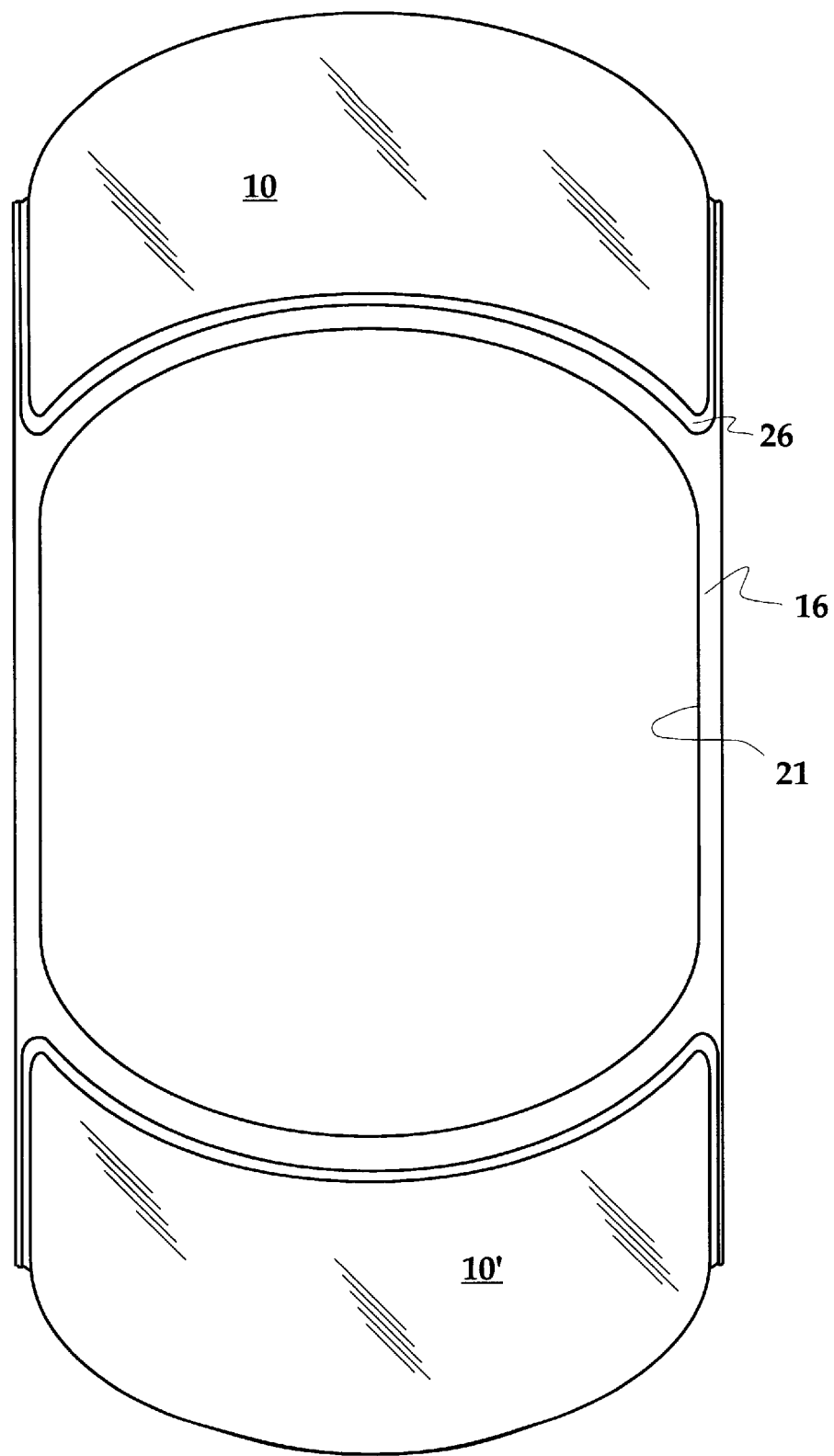
FIG. 7 is a top view of an automobile wherein a damaged roof panel section has been removed according to the method of the invention.

According to the invention, the molding and/or trim 12 is removed by unsnapping a metal molding or pulling off an adhered rubber molding. The damaged section of the damaged roof panel 11 then is removed by conventional cutting procedures. Typically, the cutting can be done from the outside of the automobile and then the removed section can be lifted up from the automobile. Care should be exercised so that no supporting structure underneath the damaged roof panel 11 is also damaged during removal of the damaged section. As shown in FIG. 7 a hole or opening 21 results from the removal of the damaged section. Typically, the opening 21 should be four-sided and in the approximate shape of a rectangle, square or trapezoid.

Figure 2:
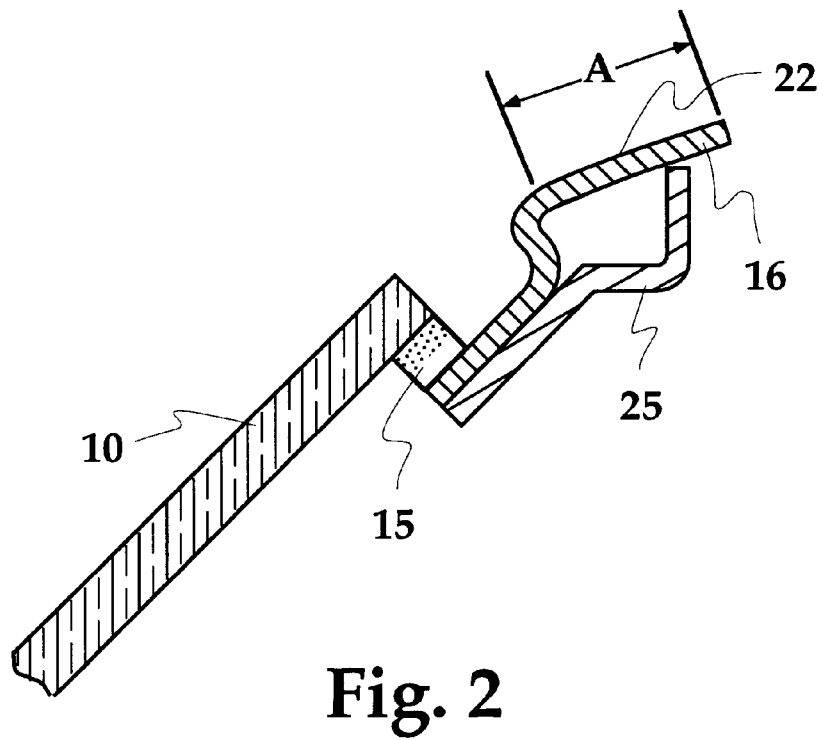
FIG. 2 is a cross-sectional side view of a front or back automobile roof panel joined assembly wherein a damaged roof section has been removed according to the method of the invention.
Figure 4:
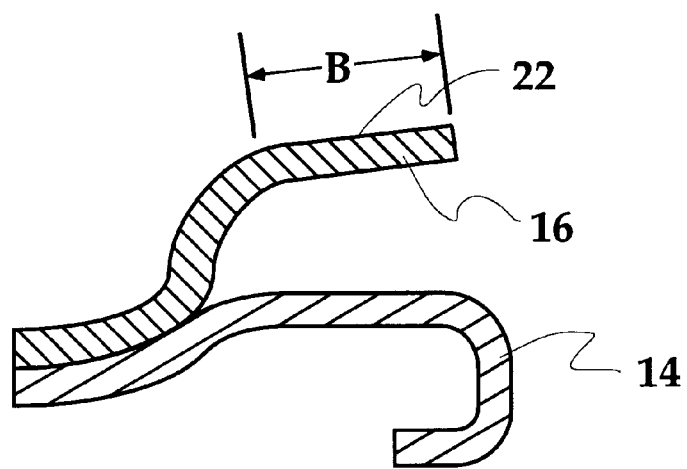
FIG. 4 is a cross-sectional side view of a door side automobile roof panel joined assembly wherein a damaged roof panel section has been removed according to the method of the invention.

An important feature of the invention is that the damaged section is removed in such a manner that an overlap section 16 of the original roof panel 11 remains as shown in FIGS. 2, 4 and 7. As shown in FIG. 7 the overlap section 16 should be present on the periphery of all sides of the opening 21 in the roof resulting from removal of the damaged section. In other words, there is an overlap section 16 at the periphery of the opening 21 at the front, back and both door sides. FIG. 4 depicts an overlap section 16 at the door side of the roof.

Figure 5:
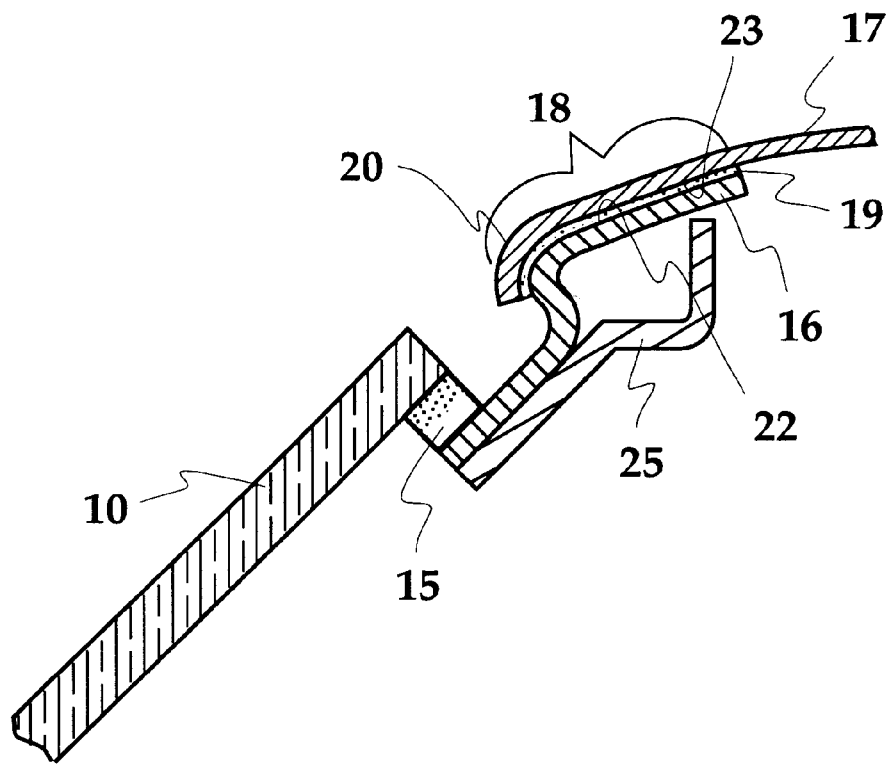
FIG. 5 is a cross-sectional side view of a front or back automobile roof panel joined assembly that includes a replacement roof panel section.

A replacement roof panel 17 then is fitted into the opening 21 resulting from the removed damaged section and permanently adhesively bonded to the overlap section 16 on all peripheral sides of the opening 21. The resulting repaired structure with the adhesively bonded replacement roof panel 17 is shown in FIG. 5 (windshield or rear glass side) and FIG. 6 (door side). The replacement roof panel 17 must include a bonding section 18 that extends beyond the outermost dimension of the opening 21 so as to provide a substrate surface for bonding to the overlap section 16. According to a preferred embodiment shown in FIG. 5 the bonding section 18 at the front and rear of the replacement roof panel 17 includes a lip section 20 that curves around the overlap section 16 to provide a mechanical hold until the adhesive cures to form the permanent bond and to fit the replacement roof panel 17 snugly under the molding and/or trim 12. It should be recognized that the profile of the bonding section 18 should conform to or mate with the profile of the overlap section 16. The replacement roof panel 17 can be made from a standard, original equipment manufacture (OEM) replacement roof. The standard OEM replacement roof panel includes a flange that corresponds to the original roof flange 13. As shown in FIG. 5 this flange is cut so that only the lip section 20 remains. With respect to the door side, the replacement roof panel 17 does not include flanges and thus does not require cutting. If necessary, the replacement roof panel 17 can be shaped by well known techniques to provide a bonding section 18 that conforms with the overlap section 16.

Figure 6:
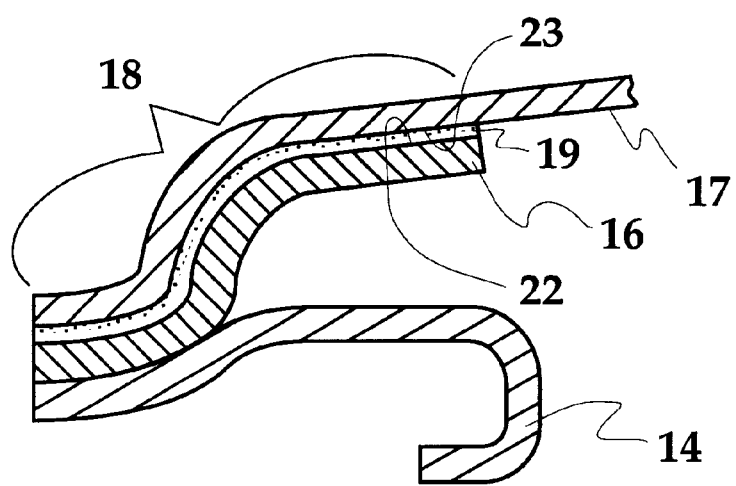
FIG. 6 is a cross-sectional side view of a door side automobile roof panel joined assembly that includes a replacement roof panel section.

According to a preferred embodiment shown in FIG. 6, the replacement roof panel 17 at the door sides is not cut and the periphery extends to completely overlap the overlap section 16. This permits clamping of the resulting structure and provides greater structural strength.

The overlap section 16 should be sufficiently long to provide an adequate bonding surface area. Typically, the minimum length A (as shown in FIG. 2) for the front or back should be about one inch, preferably two inches. The minimum length B (as shown in FIG. 4) should be about ½ inch, preferably about ¾ inch. It should be recognized that the length could be significantly longer in instances where the damaged roof area is located a relatively substantial length away from the front, back and/or door joint sides.

The replacement roof panel 17 is bonded to the overlap section 16 with an adhesive 19. The use of an adhesive for this bonding is a significant advantage of the inventive method since it avoids the use of welding. Welding, as explained previously, can cause a myriad of problems.

The adhesive 19 is applied to an exterior surface 22 of the overlap section 16 and/or to an interior surface 23 of the bonding section 18. The adhesive can be applied via any conventional means such as spraying, coating or squeezing from a cartridge. Of course, the bonding surfaces of the overlap section 16 and the bonding section 18 may require removal of paint, E-coats or other protective coatings prior to application of the adhesive.

The type of adhesive used can be any adhesive that is capable of bonding metal-to-metal, metal-to-SMC or SMC-to-SMC. The adhesive should be a structural adhesive that is designed to adhere load-bearing joints between two high-strength adherends. Particularly preferred adhesives are Fusor® metal bonding adhesives that are commercially available from Lord Corporation. Fusor® metal bonding adhesives are one or two-part (meth)acrylic-containing adhesive systems. Other types of metal-to-metal bonding adhesives may be used such as urethane or epoxy adhesives may also be used. The permanent bond between the overlap section 16 and the bonding section 18 is achieved when the adhesive cures. Depending upon the type of adhesive employed, curing can be room temperature cure (e.g., mixing together of two part adhesive systems), heat cure, moisture cure or radiation cure.

After the adhesive has been applied, the replacement roof panel 17 is contacted with the exterior surface of the overlap section 16 to form a repair joint assembly. The repair joint assembly can be securely held in place by a variety of conventional means such as clamping, sand-bagging or screws until the adhesive cures. As a result of the method of the invention, the exterior surface of the replacement roof panel 17 is a continuously smooth surface that does not have any seams.

After the adhesive 19 has cured the molding and/or trim 12 is re-inserted and re-adhered resulting in a repaired automotive roof.

What is claimed is:

1. A method for replacing a damaged automobile exterior roof panel section comprising:

removing a section of the automobile exterior roof panel that contains the damage resulting in the formation of an opening such that a peripheral overlap portion of the exterior roof panel remains, wherein the peripheral overlap portion has an exterior surface and extends from the edge of the opening to (a) a first joint between the exterior roof and a windshield or a rear glass or (b) a second joint between the exterior roof and a door side support frame wherein the peripheral overlap portion (a) near the first joint has a length of about one inch to about two inches and the peripheral overlap portion (b) near the second joint has a length of ½ inch to ¾ inch;

providing a replacement roof panel that extends beyond the outermost dimensions of the opening and includes a peripheral bonding section having an interior surface, (i) a first lip section at its peripheral edge that conforms to and substantially completely overlaps a curved contour of the peripheral overlap section extending to the second joint between the exterior roof and the door side support frame and (ii) a second lip section at its peripheral edge that conforms to and partially overlaps a curved contour of the peripheral edge section extending to the first joint between the exterior roof and a windshield or a rear glass, wherein the replacement roof panel is an original equipment manufacture replacement roof that is pre-cut to provide the second lip section;

applying a curable structural adhesive to at least one of the exterior surface of the peripheral overlap portion and the interior surface of the peripheral bonding section; and then bonding the exterior surface of the peripheral overlap portion with the interior surface of the peripheral bonding section so as to permanently attach the replacement roof panel.

2. A method according to claim 1 wherein molding or trim in at least the first or second joint is removed prior to removing the damaged section of the exterior roof panel.

3. A method according to claim 1 wherein the adhesive is selected from the group consisting of a (meth)acrylic-containing adhesive, a urethane adhesive and an epoxy adhesive.

* * * * *